United States Patent
Larson et al.

(10) Patent No.: US 8,407,195 B2
(45) Date of Patent: Mar. 26, 2013

(54) EFFICIENT MULTI-VERSION LOCKING FOR MAIN MEMORY DATABASES

(75) Inventors: Per-Ake Larson, Redmond, WA (US); Spyridon Blanas, Madison, WI (US); Cristian Diaconu, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 200 days.

(21) Appl. No.: 13/042,269

(22) Filed: Mar. 7, 2011

(65) Prior Publication Data
US 2012/0233139 A1 Sep. 13, 2012

(51) Int. Cl.
G06F 17/30 (2006.01)
(52) U.S. Cl. ........................................ 707/704
(58) Field of Classification Search ............... 707/704
See application file for complete search history.

(56) References Cited

U.S. PATENT DOCUMENTS

| | | | | |
|---|---|---|---|---|
| 5,623,659 A * | 4/1997 | Shi et al. | ............................... | 1/1 |
| 5,701,480 A | 12/1997 | Raz | | |
| 6,681,226 B2 | 1/2004 | Bretl | | |
| 2002/0138353 A1* | 9/2002 | Schreiber et al. | ............... | 705/26 |
| 2008/0034172 A1* | 2/2008 | Duffy et al. | .................... | 711/156 |
| 2008/0256073 A1* | 10/2008 | Detlefs et al. | ..................... | 707/8 |
| 2009/0132535 A1 | 5/2009 | Surtani | | |
| 2010/0174875 A1* | 7/2010 | Dice et al. | ..................... | 711/152 |

OTHER PUBLICATIONS

Rastogi, Rajeev et al., "Logical and Physical Versioning in Main Memory Databases", 10 pgs, Proceedings of the 23rd VLDB Conference, Athens, Greece, 1997.

"Design of Main Memory Database System/Concurrency", Dec. 1983, from Wikibooks, the open-content textbook collection, 11 pgs. Retrieved online Dec. 17, 2010, http://en.wikibooks.org/wiki/Design_of_Main_Memory_Database_System/Concurrency11.
"CIS 307: Deadlocks:" 7 pgs. Retrieved online Dec. 17, 2010 http://www.cis.temple.edu/~ingargio/cis307/readings/deadlock.html.
"Pessimistic vs. Optimistic concurrency control". 3 pgs. Retrieved online Dec. 17, 2010 http://publib.boulder.ibm.com/infocenter/soliddb/v6r3/topic/com.ibm.swg.im.soliddb.sql.doc/doc/pessimistic.vs.optimistic.concurrency.control.html.
Bernstein, Philip A. and Goodman, Nathan, "Multiversion Concurrency Control-Theory and Algorithms", ACM Transactions on Database Systems, vol. 8, No. 4, Dec. 1983, pp. 465-483.
Thomasian, Alexander, "Concurrency Control: Methods, Performance, and Analysis", ACM Computing Surveys, vol. 30, No. 1 Mar. 1998, pp. 70-119.
Berenson et al., "A Critique of ANSI SQL Isolation Levels", Proc. ACM SIGMOD 95, pp. 1-12, San Jose CA, Jun. 1995.
Cahill, Michael James, "Serializable Isolation for Snapshot Databases", Aug. 2009, 135 pgs.
Carey, Michael J., "Multiple versions and the performance of optimistic concurrency control", 28 pgs, Computer Science Technical Report #517, C.S.D., University of Wisconsin, Oct. 1993.
Carey, Michael J. et al., "The Performance of Multiversion Concurrency Control Algorithms" ACM Transactions on Database Systems, vol. 4, No. 4, Nov. 1986, pp. 338-378.
Fraser, Kier, "Practical lock-freedom" Technical Report #579, Cambridge University Feb. 2004, 119 pgs.

(Continued)

Primary Examiner — Thu-Nguyet Le
(74) Attorney, Agent, or Firm — Workman Nydegger (57) ABSTRACT

A transaction creates a wait for dependency on a version in a main memory database implementing a multi-version concurrency control scheme. The wait for dependency allows the transaction to update the version while other transactions are reading the version. The multi-version concurrency control scheme also allows commit dependencies to be implementing concurrently with wait for dependencies. Commit dependencies allow a transaction to read an updated version before the updated version is committed.

20 Claims, 6 Drawing Sheets

OTHER PUBLICATIONS

Herlihy, Maurice et al., "The Repeat Offender Problem: A Mechanism for Supporting Dynamic-Sized, Lock-Free Data Structures" C.S.D. Brown University, Jul. 2002, 15 pgs.

Johnson, Ryan et al. "Improving OLTP Scalability using Speculative Lock Inheritance" VLDB '09, Aug. 24-28, 2009, 11pgs.

Kung, H.T. et al., "On optimistic methods for concurrency control" ACM Transactions on Database Systems, vol. 6, No. 2, Jun. 1981, pp. 213-226.

Maged, Michael M., "Hazard Pointers: Safe Memory Reclamation for Lock-Free Objects" IEEE Transactions on Parallel and Distributed Systems, vol. 15, No. 6, Jun. 2004, pp. 491-504.

Thomasian, Alexander et al, "Performance Analysis of Two-Phase Locking" IEEE Transactions on Software Engineering, vol. 17, No. 5, May 1991, pp. 386-402.

Concurrency Control: (Chapter 13), 1996-2010. 1pg, Retrieved online Dec. 17, 2010, http://www.postgresql.org/docs/8.4/static/mvcc.html.

* cited by examiner

A First Transaction Places A Read Marker On A Version Of A Record In A Database, The Read Marker Indicating That The First Transaction Is Reading The Version Of The Record, But Does Not Prevent Another Transaction From Reading Or Updating The Record Concurrently

502

Before The First Transaction Terminates, A Second Transaction Acquires A Write Lock On The Version Of The Record, The Write Lock Preventing Another Transaction From Updating The Version Of The Record

503

As Part Of Acquiring The Write Lock, The Second Transaction Creates A Wait For Dependency On The Version

504

The Second Transaction Continues Processing, But Waits To Commit Until The First Transaction Terminates And Removes The Read Marker On The Version

EFFICIENT MULTI-VERSION LOCKING FOR MAIN MEMORY DATABASES

CROSS-REFERENCE TO RELATED APPLICATIONS

N/A

BACKGROUND

Main memories are becoming sufficiently large that the working set of most Online Transaction Processing databases can be stored in memory. A database system optimized for in-memory storage can support much higher transaction rates than current systems. However, standard concurrency control methods do not scale to the high transaction rates achievable by such systems.

A database system optimized for in-memory storage and running on a many-core processor can support very high transaction rates and levels of concurrency. Efficiently ensuring isolation between concurrently executing transactions becomes challenging in such an environment. Current database systems typically implement isolation by means of locking However, traditional single-version locking suffers from scalability constraints, making traditional locking unsuitable for systems with very high transaction rates.

BRIEF SUMMARY

The present invention extends to methods, systems, and computer program products for implementing concurrency control by means of efficient multi-version locking in main memory databases where locks are non-blocking and correct ordering of transactions is enforced by a dependency mechanism.

In one embodiment, a first transaction places a read marker (a.k.a. read lock) on a version of a record in a database. The read marker indicates that the first transaction is reading the version of the record, but does not prevent another transaction from reading or updating the record concurrently. Before the first transaction terminates, a second transaction acquires a write lock on the version of the record. The write lock prevents another transaction from updating the version of the record. The second transaction also creates a wait for dependency on the version. The second transaction continues processing, but waits to begin its commit until the first transaction terminates and removes the read marker on the version.

In another embodiment, one or more first transactions each place a scan marker on a bucket in a hash table. A second transaction then attempts to add a new version of a record to the bucket. The second transaction, upon detecting the one or more scan markers on the bucket, creates a wait for dependency on each of the one or more first transactions. The second transaction continues processing, but waits to begin its commit until each of the one or more first transactions terminate.

In another embodiment, a first transaction acquires a write lock on a version of a record. While the version is write locked by the first transaction, a second transaction attempts to place a read marker on the version. Upon determining that the version is write locked by the first transaction, the second transaction creates a wait for dependency on the version for the first transaction and places a read marker on the version. The wait for dependency causes the first transaction to wait to begin its commit until the second transaction has terminated.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for implementing multi-version concurrency control in main memory databases where locks are non-blocking and correct ordering of transactions is enforced by a dependency mechanism. The present invention also includes embodiments of a multi-version concurrency control database that can implement both optimistic and pessimistic transactions simultaneously.

In one embodiment, a first transaction places a read marker on a version of a record in a database. The read marker indicates that the first transaction is reading the version of the record, but does not prevent another transaction from reading or updating the record concurrently. Before the first transaction terminates, a second transaction acquires a write lock on the version of the record. The write lock prevents another transaction from updating the version of the record. The second transaction also creates a wait for dependency on the version. The second transaction continues processing, but waits to begin its commit until the first transaction terminates and removes its read marker on the version.

In another embodiment, each of one or more first transactions places a scan marker on a bucket in a hash table. A second transaction then attempts to add a new version of a record to the bucket. The second transaction, upon detecting the one or more scan markers on the bucket, creates a wait for dependency on each of the one or more first transactions. The second transaction continues processing, but waits to begin its commit until each of the one or more first transactions terminate.

In another embodiment, a first transaction acquires a write lock on a version of a record. While the version is write locked by the first transaction, a second transaction attempts to place a read marker on the version. Upon determining that the version is write locked by the first transaction, the second transaction creates a wait for dependency on the version for the first transaction and places a read marker on the version. The wait for dependency causes the first transaction to wait to begin its commit until the second transaction has terminated.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer. Computer-readable media that store computer-executable instructions are physical computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, DVD, or other optical disk storage, magnetic disk storage or other magnetic storage devices, or any other medium which can be used to store desired program code means (software) in the form of computer-executable instructions or data structures and which can be accessed and executed by one or more processors of a general purpose or special purpose computer to implement aspects of the invention, such that they are not merely transitory carrier waves or propagating signals.

A "network" is defined as one or more data links that enable the transport of electronic data between computers and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer RAM and/or to less volatile computer storage media (devices) at a computer. Thus, it should be understood that computer storage media (devices) can be included in computer components that also (or even primarily) utilize transmission media.

Computer-executable instructions comprise, for example, instructions and data which, when executed at one or more processors, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computers, which are linked (either by hardwired data links, wireless data links, or by a combination of hardwired and wireless data links) through a network, both perform tasks. In a distributed system environment, program modules may be located in both local and remote memory storage devices.

Prior to discussing the use of pessimistic transactions to implement the multi-version concurrency control scheme of the present invention, various basic concepts of an exemplary multi-version concurrency control scheme usable in the present invention will be described. In this exemplary multi-version concurrency control scheme, a transaction is given two unique timestamp that indicate the logical time of its begin and end events, respectively. These timestamps are used to define the overall ordering among transaction events. A timestamp as used herein may be a value received from a monotonically increasing counter and is not limited to a clock value.

For example, when a transaction begins, it can receive a timestamp by reading and incrementing a timestamp counter. This begin timestamp uniquely identifies the transaction and therefore in some embodiments can serve as the transaction id. When a transaction terminates, it can also receive an end timestamp by reading the timestamp counter and incrementing it. If the transaction terminates by committing, this end timestamp can also serve as its commit timestamp. This use of timestamps enables the multi-versioning scheme to preserve serializability among the concurrent transactions.

Records in the main memory database are versioned to allow for concurrent access by multiple transactions. Timestamps are also used to identify versions of records and their valid times. For example, a committed version of a record contains two timestamps, a start timestamp and an end timestamp. The start timestamp of a committed version is equal to the commit time of the transaction that created the version. For example, if a transaction T1 creates a version of a record during its processing (such as by modifying an existing record or creating a new record), the created version will receive the same start timestamp as the transaction T1's commit timestamp.

A version's end timestamp is initially set to a value that indicates that the timestamp is not yet determined such as infinity. However, when another transaction T2 commits a modification to the version (whether an update to the version that thus creates a new version, or a deletion of the version), the version's end timestamp is set to the commit timestamp of transaction T2. In other words, once T2 commits (thus making its new version of the record or deletion of the record durable), the previous version of the record is no longer valid.

Prior to T2 committing, the end timestamp of the version is set to T2's transaction ID because T2's commit time is not yet known. This same transaction ID is also initially used as the start timestamp of the new version for the same reason. Thus, when a transaction creates a new version, it assigns its transaction ID to the end timestamp of the version being modified, and the start timestamp of the new version. Once T2 commits, it writes its commit timestamp as the end timestamp of the old version and as the start timestamp of the new version. To distinguish between versions that contain a valid timestamp and those that have a temporary transaction ID assigned as its timestamp, a flag may be used.

Figure 1:
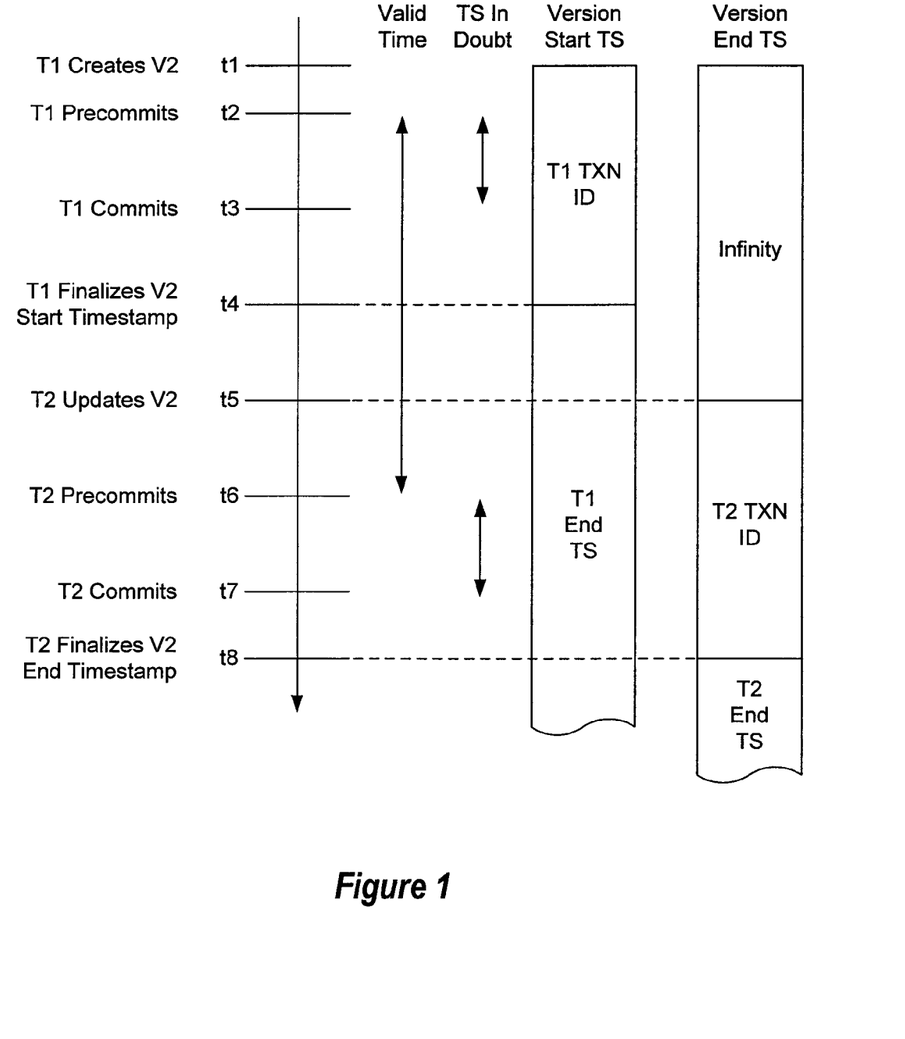
FIG. 1 illustrates an example of how a version's timestamps are set according to one or more embodiments.

FIG. 1 illustrates an exemplary lifetime of a version V2 and how its timestamps are set. At time t1, a transaction T1 creates version V2 by updating a prior version. T1 sets V2's start timestamp to its own transaction ID and V2's end timestamp to a value such as infinity to indicate that the end timestamp is undetermined. Because V2's start timestamp is set to T1's transaction ID, other transactions can find T1's transaction object and thus determine T1's status. T1 also sets the end timestamp of version V1 (the version that is updated to create V2) to T1's transaction ID to indicate to other transactions that V1 has been updated and is write locked.

At time t2, T1 precommits. Precommitting involves T1 obtaining an end timestamp and entering a validation stage prior to committing. This time, t2, is the start of V2's valid time. However, because T1 has not yet committed, and may still abort, the existence of V2 is still in doubt. Accordingly, V2's start timestamp remains as T1's transaction ID.

At time t3, T1 completes the validation stage and commits. At time t4, T1 then updates V2's start timestamp from its transaction ID to its end timestamp, t2. Thus, V2's start timestamp indicates that it became valid (from the perspective of other transactions) as soon as T1 committed which made V2 durable. V2's start and end timestamps, at this point, are t2 and infinity, respectively. At the same time T1 also updates V1's end timestamp to t2 (not shown in the figure) which indicates that V1's valid time ended at t2.

At some later time, t5, a transaction T2 updates V2 to create a new version V3. T2 takes similar steps to set V2's and V3's timestamps as T1 did to set V2's and V1's timestamps as described above. For example, T2 sets V2's end timestamp to T2's transaction ID. At time t6, T2 precommits and receives t6 as its end timestamp. If T2 proceeds to commit, t6 will be the end of V2's valid time. Once committed, T2 sets V2's end timestamp to t6.

To summarize the above example, V2's start timestamp takes on two values. First, it is initialized with T1's transaction ID upon being created, and then set to T1's end timestamp once T1 commits. This indicates that V2 becomes valid once the changes made by T1 are durable. In contrast, V2's end timestamp takes on three values. First, it is initialized to infinity, then it is set to T2's transaction ID, and finally, it is set to T2's end timestamp once T2 commits. This indicates that once V3, which is created by T2, becomes durable upon T2 committing, V2 is no longer valid.

Concurrently running transactions may interfere with each other so as to produce incorrect results. A concurrency control technique is called pessimistic if it relies on proactively preventing such harmful interference from ever occurring. This is typically implemented by means of locking. An optimistic concurrency control technique, on the other hand, does not attempt to prevent interference proactively but instead relies on validating that no harmful interference occurred before allowing a transaction to commit. Similarly, a transaction is called pessimistic or optimistic depending on the type of concurrency control technique it relies on.

The present invention allows pessimistic and optimistic transactions to co-exist. A pessimistic transaction uses read markers, scan markers and write locks to implement the multi-version concurrency control scheme of the present invention. A pessimistic transaction prevents its reads from being invalidated by placing markers. In the present invention two different types of markers may be used to implement pessimistic transactions: read markers and scan markers. Read markers are placed on versions to ensure read stability, whereas scan markers are placed on buckets to prevent phantoms. A bucket may refer to a hash index, however, the present invention is not limited to databases using hash indexes; scan markers can be applied equally to ordered indexes and the like.

A transaction places a scan marker on a hash table bucket before beginning a scan of the records in the bucket. This does not prevent new records from being added to the bucket but the new versions cannot be committed until the scan marker has been removed. If an ordered index is implemented by a tree structure, a scan marker on a node protects the subtree rooted at that node. Also, if an ordered index is implemented by skip lists, a scan marker on a tower protects the range from that tower to the next tower of the same height. Phantoms occur when the set of versions returned by a query at the start of a transaction is different from the set of versions returned by the same query at the end of the transaction.

A transaction places a read marker on a version V by incrementing V's read marker count. In some embodiments, a version may be limited to a maximum number of read markers and may also include a flag to prevent any further read markers from being placed. Therefore, at any given time, a version may have multiple read markers. In contrast, a version may only have a single write lock at any given time.

Figure 2:
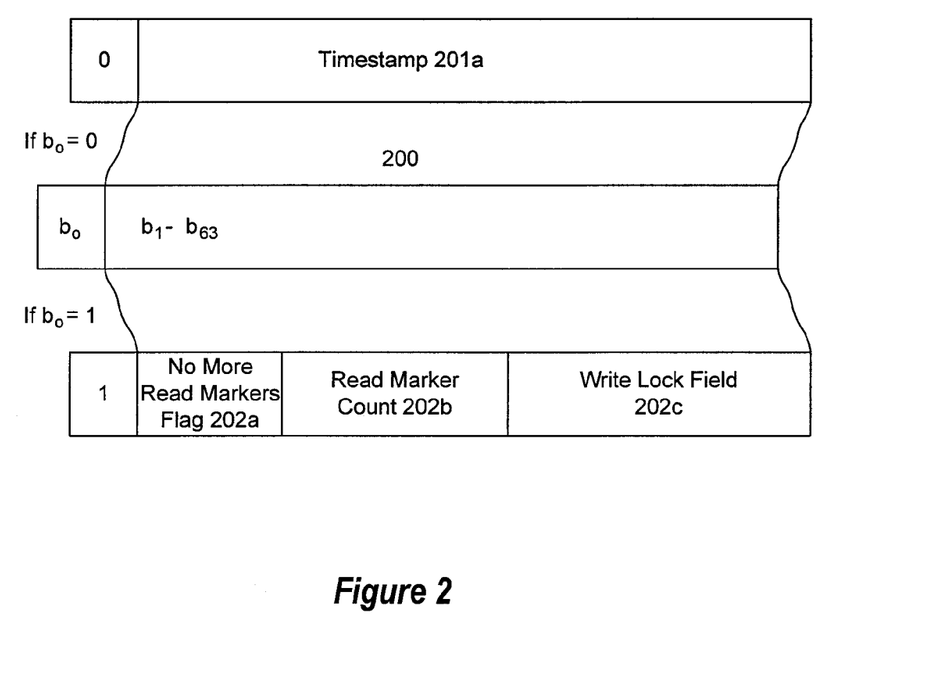
FIG. 2 illustrates an exemplary data structure representing a record lock according to one or more embodiments.

FIG. 2 illustrates an exemplary data structure 200 representing read markers according to some embodiments of the present invention. As described above, each version contains an end timestamp field 201a which may contain a timestamp. FIG. 2 further describes how the present invention can use this field to record read markers.

As shown in FIG. 2, to enable the use of the end timestamp field 201a for both a timestamp as well as read markers, a first bit is designated as a content type bit which defines the type of content the field contains. In the exemplary data structure shown in FIG. 2, the first bit of the field is defined as this content type bit. When the content type bit is set to a first value (e.g. 0), the remaining 63 bits of the field are the timestamp field 201a as described above. However, when the content type bit is set to a second value (e.g. 1), the remaining 63 bits of the field are interpreted differently. For example, as shown in FIG. 2, the 63 bits may be divided between a no more read marker flag 202a, a read marker count 202b, and a write lock field 202c. The no more read marker flag 202a may be set to prevent any further read markers from being placed on the version. The read marker count 202b records the current number of read markers on the version. The write lock field 202c contains the transaction ID of the transaction (if any) holding a write lock on the version, or infinity if the version is not locked as described above.

Using the exemplary data structure of FIG. 2, a transaction can write lock a version by writing its transaction ID into the version's write lock field 202c. Similarly, a transaction can place a read marker on a version by incrementing the version's read marker count 202b. A read marker in the present invention is different from a read lock in typical database implementation because a read marker on a version does not prevent another transaction from updating the version as will now be further described.

In a traditional locking implementation of a database, when a transaction attempts to update a version that is read locked, it would be forced to block. In contrast, in the present invention, if a read marker has been placed on a version by one or more transactions, another transaction may write lock the version to update it. In other words, the updating transaction is not forced to block until the read markers are removed. The updating transaction may continue processing, including updating the version; however, the updating transaction cannot commit until all read markers on the version have been removed.

Similarly, in the present invention, if a version is write locked by one transaction, another transaction may concurrently place a read marker on the version. In this scenario, the updating transaction (the one with the write lock) cannot commit until the read marker is removed. A read marker can be removed by either the reading transaction committing or aborting. Accordingly, in each of the above described scenarios, the updating transaction is forced to wait to commit until all read markers on the version are removed whether the updating transaction write locks the version before or after the one or more read markers are placed.

Similar rules apply to scan markers. For example, if a first transaction has placed a scan marker on a bucket, a second transaction is allowed to insert a new version into the bucket. However, the second transaction is not allowed to commit until the first transaction removes its scan marker on the bucket.

To facilitate correct serialization when using these schemes, the present invention implements wait for dependencies. A wait for dependency forces an update transaction to wait before it can acquire an end timestamp and begin commit processing. To implement these wait for dependencies, a transaction keeps track of its incoming and outgoing wait for dependencies. An incoming dependency is one that the transaction waits on whereas a transaction has an outgoing dependency if some other transaction waits on the transaction to complete.

Figure 3:
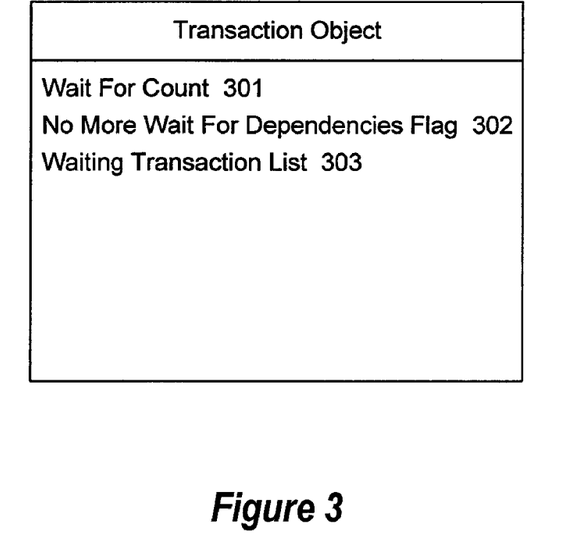
FIG. 3 illustrates an exemplary data structure representing a transaction object according to one or more embodiments.

As shown in FIG. 3, each transaction includes fields to track dependencies. The fields may be contained in the transaction object, as shown in FIG. 3, or elsewhere. For incoming wait for dependencies, two fields can be maintained: a wait for count 301 and a no more wait for dependencies flag 302. The wait for count 301 indicates how many incoming wait for dependencies a transaction is waiting for. The no more wait for dependencies flag 302 can be set to prevent the creation of any more incoming dependencies. This flag can be used, for example, to prevent starvation by new incoming dependencies continuously being added. For outgoing wait for dependencies, a waiting transaction list 303 is maintained. This list contains the transaction IDs of any other transactions that are waiting for the transaction to complete.

The following paragraphs describe how the two exemplary data structures shown in FIGS. 2 and 3 can be used to implement wait for dependencies utilizing the multi-version concurrency control schemes of the present invention. When a transaction TU updates a version V, it obtains a write lock on V by copying its transaction ID into V's write lock field 202c. If V's read marker count 202b is greater than zero, TU takes a wait for dependency on V by incrementing TU's wait for count 301. In this example, it can be viewed that TU creates its own wait for dependency.

TU can also obtain a wait for dependency in another way. If TU obtains a write lock on V while V's read marker count 202b is zero, TU will not initially take out a wait for dependency on V. While V is locked by TU, another transaction TR may attempt to place a read marker on V. TR will detect that V's read marker count 202b is zero, but that V is write locked. TR then reads TU's no more wait for dependencies flag 302 to determine whether TU will allow a wait for dependency to be created. If TU's no more wait for dependencies flag 302 is not set, TR places a read marker on V by incrementing V's read marker count, and gives TU a wait for dependency on V by incrementing TU's wait for count 301. For this reason, it can be viewed that TR gives TU a wait for dependency in this example.

To remove a read marker on a version V, a transaction TR performs different steps depending on various factors including whether V has outstanding read markers, and whether another transaction TU has a write lock on V. In a first scenario, if V is not write locked, TR simply decrements V's read marker count 202b and proceeds. In a second scenario, if V is write locked, but one or more other transactions have placed read markers on V (i.e. V's read marker count is greater than one), TR also simply decrements V's read marker count 202b and proceeds.

However, in a third scenario, if V is write locked and V's read marker count is equal to one (meaning that TR is the only transaction with a read marker on V), TR is about to remove the last read marker on V. In this third scenario, TR must release TU's wait for dependency on V. To do so, TR sets V's read marker count 202b to zero and V's no more read markers flag 202a to true thus preventing any further read markers from being obtained on V. Then, TR locates TU (by reading its transaction ID in V's write lock field 202c) and decrements TU's wait for count 301.

V's no more read markers flag 202a is set to true prior to releasing TU's wait for dependency on V to ensure that no other transaction places a read marker on V prior to TU committing the updated version of V. This is necessary because once TU's wait for dependency is removed, TU can proceed to commit. Thus V will become invalid by being replaced by an updated version V' created by TU.

Figure 4:
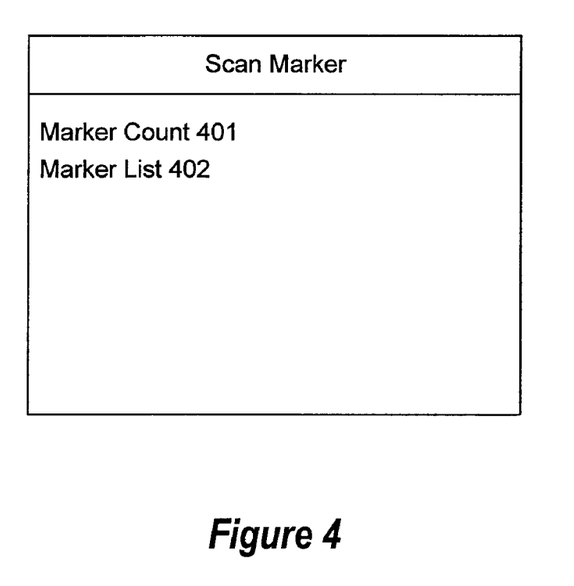
FIG. 4 illustrates an exemplary data structure representing a scan marker according to one or more embodiments.

FIG. 4 illustrates an exemplary data structure 400 that is used to implement scan markers in some embodiments of the invention. Wait for dependencies related to scan markers function similarly to wait for dependencies related to read markers. A transaction TR places a scan marker on a bucket B by incrementing B's marker count 401 and adding its transaction ID to B's marker list 402. The purpose of the scan marker is not to prevent a version from being added to the bucket, but, instead to prevent any versions which are added while the scan marker is in place from becoming visible to TR during its processing. In other words, another transaction TU can add a version to B, but TU cannot commit until TR removes its marker on B. This is enforced by TU obtaining a wait for dependency on TR.

It is noted that in this scan marker scenario, this specification refers to the wait for dependency as being on another transaction whereas in the record lock scenario, the specification refers to the wait for dependency as being on the version. This is to distinguish that the wait for dependency in the scan marker scenario is dependent on one or more transactions releasing their scan markers (i.e. a marker on a plurality of versions rather than on a single version as in the read marker scenario).

A transaction TU can acquire a wait for dependency caused by to a scan marker in two ways. First, if TU is attempting to add a new version V to a bucket B with one or more scan markers, TU takes out a wait for dependency on every transaction listed in B's marker list 402 (i.e. each transaction that has a scan marker on B). To do so, TU adds its own transaction ID to the waiting transaction list 303 of every transaction listed in B's marker list 402. TU also increments its own wait for count 301 for each transaction listed in B's marker list 402.

Second, if a transaction TR scans a bucket B and finds a version V that satisfies TR's search predicate but that is not visible to TR because V is write locked by a transaction TU that is still active, TR registers a wait for dependency for TU on TR by adding TU's transaction ID to TR's waiting transaction list 303 and incrementing TU's wait for count 301. This wait for dependency is created to prevent TU from committing before TR which would make V a phantom to TR.

Figure 5:
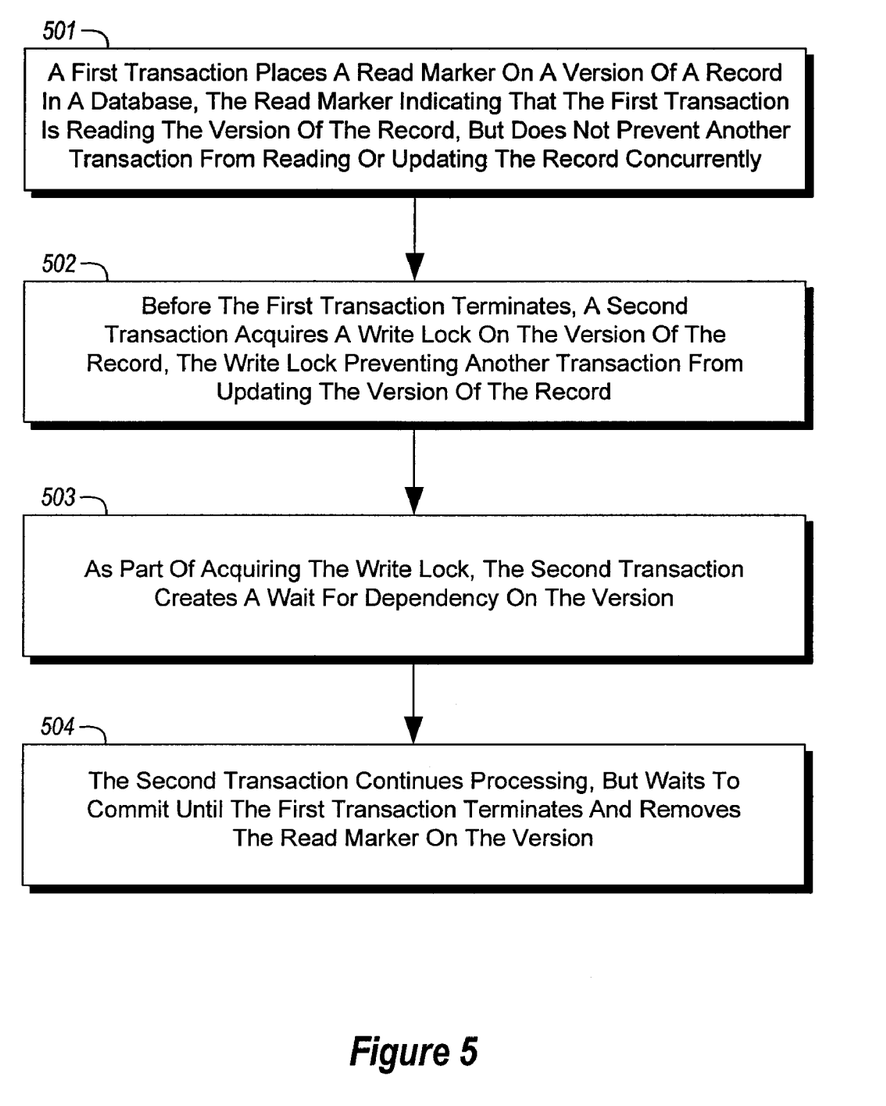
FIG. 5 illustrates a flowchart of a method for creating a wait for dependency when a transaction acquires a write lock on a version for which a read marker is currently issued.

FIG. 5 illustrates a flowchart of a method 500 for creating a wait for dependency in a multi-version concurrency control scheme of a main memory database. Method 500 will be described with reference to the exemplary data structures in FIGS. 2 and 3. In method 500, a first transaction places a read marker on a version of a record in a database (act 501). The read marker indicates that the first transaction is reading the version of the record, but does not prevent another transaction from reading or updating the record concurrently. For example, the first transaction may acquire the read marker by incrementing the version's read marker count 202b. Before the first transaction terminates, a second transaction acquires a write lock on the version of the record (act 502). The write lock prevents another transaction from updating the version of the record. For example, the second transaction may acquire the write lock by writing its transaction ID to the version's write lock field 202c. The second transaction also creates a wait for dependency on the version (act 503). For example, the second transaction may increment its wait for count 301 which may be stored in its transaction object. The second transaction continues processing, but waits to commit until the first transaction terminates and removes the read marker on the version (act 504).

Method 500 may further include the second transaction determining that the version has outstanding read markers prior to creating the wait for dependency by reading the version's read marker count 202b and determining that the read marker count 202b is greater than zero.

In some embodiments, method 500 may also include the first transaction determining that its read marker is the last read marker on the version (such as by determining that the version's read marker count 202b is equal to one prior to the first transaction terminating). The method may also include the first transaction decrementing the version's read marker count 202b, setting the version's no more read markers flag 202a, and decrementing the second transaction's wait for count 301. The first transaction may identify the second transaction by reading the second transaction's transaction ID in the version's write lock field 202c.

In other embodiments, method 500 may also include the first transaction determining that one or more other read markers have been placed on the version, and the first transaction removing its read marker by decrementing the version's read marker count 202b. In some embodiments, the version's no more read markers flag 202a, read marker count 202b, and write lock field 202c are stored within the version.

Figure 6:
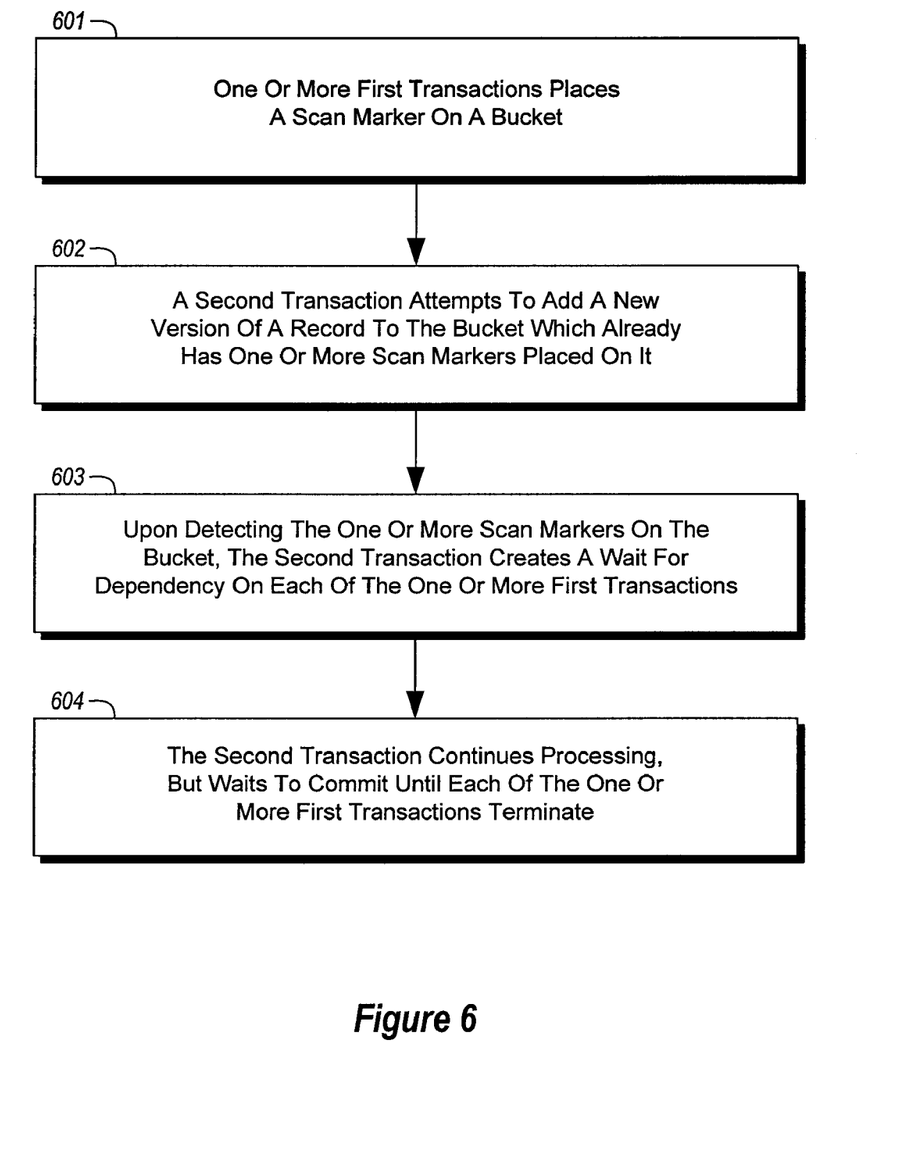
FIG. 6 illustrates a flowchart of a method for creating a wait for dependency when a transaction adds a new version to bucket that is locked by one or more other transaction.

FIG. 6 illustrates a flowchart of a method 600 for creating a wait for dependency when a transaction adds a new version to a bucket with one or more scan markers. Method 600 will be described with reference to the exemplary data structures in FIGS. 3 and 4. In method 600, one or more first transactions places a scan marker on a bucket (act 601). For example, the one or more first transactions may place the scan markers by incrementing marker count 401 and adding their transaction IDs to marker list 402. A second transaction then attempts to add a new version of a record to the bucket (act 602). The second transaction, upon detecting the one or more scan markers on the bucket, creates a wait for dependency on each of the one or more first transactions (act 603). For example, the second transaction may detect the one or more markers on the bucket by reading the bucket's marker count 401. The second transaction may then create the one or more wait for dependencies by adding its transaction ID to the waiting transaction list 303 of every transaction listed in the lock list 402. The second transaction continues processing, but waits to commit until each of the one or more first transactions terminate (act 604). For example, upon terminating, each on the one or more first transaction may decrement the second transaction's wait for count 301. Once the second transaction's wait for count 301 reaches zero indicating that the second transaction has no more wait for dependencies, the second transaction may proceed to commit.

Figure 7:
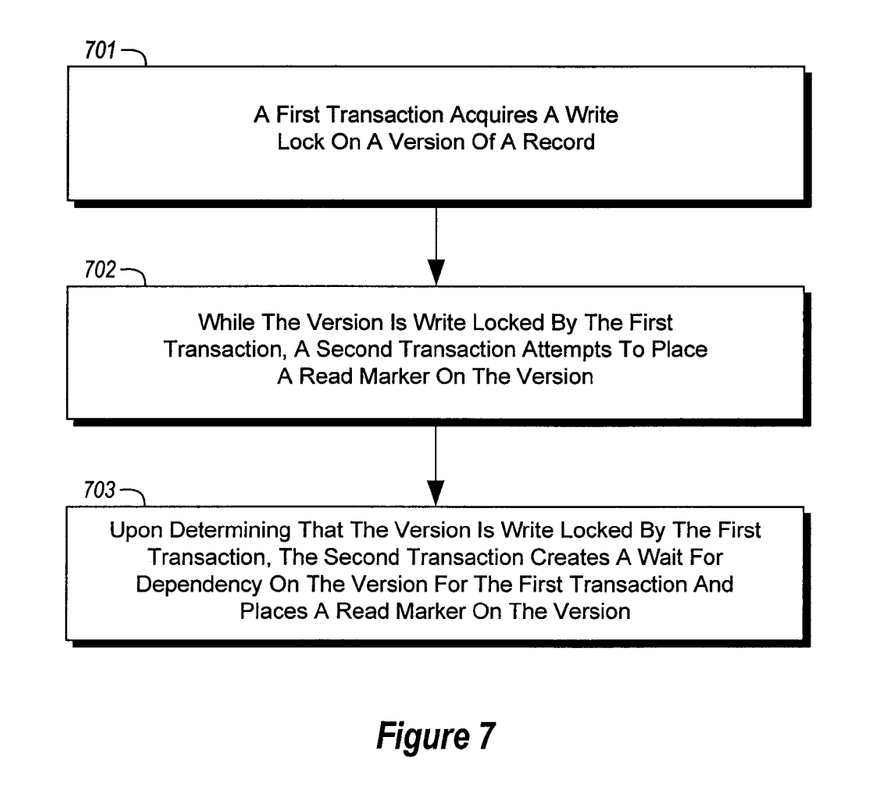
FIG. 7 illustrates a flowchart of a method for creating a wait for dependency when a transaction acquires a read marker on a version that is already write locked by another transaction.

FIG. 7 illustrates a flowchart of a method 700 for creating a wait for dependency when a transaction places a read marker on a version that is already write locked by another transaction. Method 700 will be described with reference to the exemplary data structures in FIGS. 2 and 3. In method 700, a first transaction acquires a write lock on a version of a record (act 701). For example, the first transaction may acquire the write lock by writing its transaction ID in the version's write lock field 202c. While the version is write locked by the first transaction, a second transaction attempts to place a read marker on the version (act 702). Upon determining that the version is write locked by the first transaction, the second transaction creates a wait for dependency on the version for the first transaction and places a read marker on the version (act 703). For example, the second transaction can detect that the version is write locked by determining that the version's write lock field 202c contains the first transaction's transaction ID. The second transaction may create the first transaction's wait for dependency on the version by incrementing the second transaction's wait for count 301, and may place the read marker by incrementing the version's read marker count 202b. The wait for dependency causes the first transaction to wait to commit until the second transaction has terminated and removed its read marker on the version. For example, the first transaction may continue processing, but will not commit until its wait for count 301 equals zero.

In addition to wait for dependencies as described above, embodiments of the present invention may also implement commit dependencies simultaneously with wait for dependencies.

Like wait for dependencies, commit dependencies can be either incoming or outgoing dependencies as will be further described below. Similarly, a transaction only needs to know the number of incoming commit dependencies and therefore maintains an incoming commit dependency count. Further, a transaction must track each of its outgoing commit dependencies and thus maintains an outgoing commit dependency set.

Referring again to FIG. 1, although V2 is valid from t2 to t6, there are periods were V2's validity is in doubt. In other words, because a transaction may abort after creating a new version of a record, it cannot be known that the new version will be valid until the transaction commits. Specifically, V2 is created at t1, but the start of its valid time interval is not known until T1 precommits at time t2. During this time (t1-t2), V2 is only visible to T1.

Further, although the start of V2's valid time is known once T1 precommits at t2, V2 is not stable until T1 actually commits at t3 because T1 may still abort after it has pre-committed. However, using commit dependencies according to the present invention, another transaction may be allowed to read V2 during this interval (t2-t3). Commit dependencies allow the reading transaction to assume that T1 will commit thus allowing the reading transaction to read the updated version V2 before T1 has committed. Commit dependencies can be used by both pessimistic and optimistic transactions.

Figure 8:
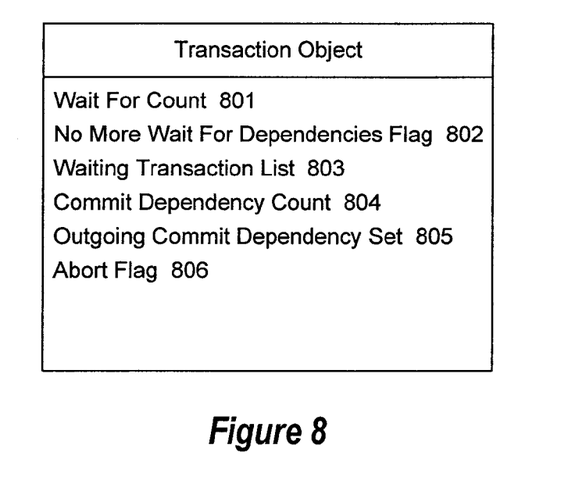
FIG. 8 illustrates an exemplary data structure representing a transaction object according to one or more embodiments.

A reading transaction TR, in this scenario, may register a commit dependency with T1. The implementation of commit dependencies will be described with reference to FIG. 8. FIG. 8 is similar to FIG. 3 in that it includes similar fields to those illustrated in FIG. 3. With reference to FIG. 8, to register a commit dependency with T1, TR increments its own incoming commit dependency count 804 and registers its transaction ID in T1's outgoing commit dependency set 805. Then, when T1 has committed, it locates TR's transaction ID in its outgoing commit dependency set 805 (as well as any other transaction IDs of other transactions that have registered commit dependencies with T1), and decrements TR's commit dependency count 804.

If TR's only dependency was with T1, its commit dependency count 804 will now be zero indicating that it is no longer waiting for any other transactions to commit. TR, therefore, can now commit. As can be seen, using this approach, TR is able to read a value from a version before it is certain that the version will be valid. If T1 aborts rather than commits, T1 will notify TR of the abort thus causing TR to abort as well (because it has read a value that will never become valid). This can be accomplished using an abort flag 806 in each transaction which when set causes the transaction to abort. The aborting transaction (in this case T1) could set this flag in TR.

Because most transactions commit, this speculative read approach using commit dependencies is very efficient. Additionally, in many cases, the reading transaction will never wait because the transaction on which the reading transaction depends finishes processing before the reading transaction is ready to commit.

The present invention includes embodiments of a multi-version concurrency control technique that can implement both optimistic and pessimistic transactions, as described above, by utilizing the read markers, scan markers and write locks, as well as both commit dependencies and wait for dependencies. The exemplary data structures illustrated in the figures and described above enable the concurrent use of both types of dependencies with the read markers, scan markers and write locks.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for creating a wait for dependency in a multi-version concurrency control scheme of a main memory database, the method comprising:
 a first transaction placing a read marker on a version of a record in a database, the read marker indicating that the first transaction is reading the version of the record, but does not prevent another transaction from reading or updating the record concurrently;
 before the first transaction terminates, a second transaction acquiring a write lock on the version of the record, the write lock preventing another transaction from updating the version of the record;
 as part of acquiring the write lock, the second transaction creating a wait for dependency on the version; and
 the second transaction continuing processing, but waiting to begin commit until the first transaction terminates and removes the read marker on the version.

2. The method of claim 1, wherein the second transaction creates the wait for dependency by incrementing the second transaction's wait for count.

3. The method of claim 2, wherein the wait for count is stored in the second transaction's transaction object.

4. The method of claim 2, further comprising:
 the first transaction determining that the version's read marker count indicates that the first transaction is the only transaction with a read marker on the version; and
 the first transaction setting the version's no more read markers flag to prevent another transaction from placing a read marker on the version.

5. The method of claim 4, further comprising:
 the first transaction identifying the second transaction by reading the second transaction's transaction ID in a write lock field of the version, and decrementing the second transaction's wait for count.

6. The method of claim 1, wherein the first transaction places the read marker on the version by incrementing a read marker count of the version.

7. The method of claim 1, wherein the second transaction acquires the write lock by writing its transaction ID into a write lock field of the version.

8. The method of claim 7, wherein the version's write lock field is stored within the version.

9. The method of claim 1, further comprising:
 one or more other transactions placing a read marker on the version while the version is write locked by the second transaction, wherein each of the one or more other transactions place a read marker by incrementing the version's read marker count.

10. The method of claim 9, further comprising:
 the first transaction terminating and removing its read marker on the version prior to the one or more other transactions terminating and removing their read markers on the version;
 the one or more other transactions terminating and removing their read markers on the version, wherein the last of the one or more other transactions to terminate and remove its read marker on the version further performs the following:
  determining that the version's read marker count indicates that the last of the one or more other transactions is the only transaction with a read marker on the version;
  setting the version's no more read markers flag to prevent another transaction from acquiring a read marker on the version;

identifying the second transaction as the transaction with the write lock on the version by reading the second transaction's transaction ID in the version's write lock field; and decrementing the second transaction's wait for count.

11. The method of claim 1, further comprising:
the second transaction creating a modified version of the version;
the second transaction precommitting;
while the second transaction is precommitting, but before the second transaction commits, a third transaction creating a commit dependency on the second transaction and reading the modified version; and
the third transaction continuing processing, but waiting to commit until the second transaction commits.

12. The method of claim 11, wherein creating the commit dependency comprises the third transaction incrementing its commit dependency count, and writing its transaction ID to the second transaction's outgoing commit dependency set.

13. The method of claim 12, further comprising:
upon the second transaction committing, the second transaction reading the third transaction's transaction ID in the second transaction's outgoing commit dependency set; and
the second transaction decrementing the third transaction's commit dependency count.

14. A method for creating a wait for dependency in a multi-version concurrency control scheme of a main memory database, the method comprising:
one or more first transactions placing a scan marker on a bucket;
while the bucket is marked by the one or more first transactions, a second transaction attempting to add a new version of a record to the bucket;
upon detecting the one or more markers on the bucket, the second transaction creating a wait for dependency on each of the one or more first transactions; and
the second transaction continuing processing, but waiting to commit until each of the one or more first transactions terminate.

15. The method of claim 14, wherein the second transaction creating the wait for dependency on each of the one or more first transactions comprises the second transaction adding its transaction ID to each of the one or more first transaction's waiting transaction list, and the second transaction incrementing its wait for count for each of the one or more first transactions.

16. The method of claim 15, further comprising:
upon terminating, each of the one or more first transactions decrementing the second transaction's wait for count.

17. A method for creating a wait for dependency in a multi-version concurrency control scheme of a main memory database, the method comprising:
a first transaction acquiring a write lock on a version of a record;
while the version is write locked by the first transaction, a second transaction attempting to place a read marker on the version;
upon determining that the version is write locked by the first transaction, the second transaction creating a wait for dependency on the version for the first transaction, wherein the second transaction creates the wait for dependency on the version for the first transaction by incrementing the first transaction's wait for count;
the second transaction placing a read marker on the version, wherein the wait for dependency causes the first transaction to wait to commit until the second transaction has terminated;
the second transaction, upon terminating, decrementing the first transaction's wait for count;
the first transaction determining that its wait for count indicates that the first transaction has no more wait for dependencies; and
the first transaction committing.

18. The method of claim 17, further comprising the first transaction creating a modified version of the version.

19. The method of claim 18, wherein the method further comprises, after the second transaction terminates, the first transaction pre-committing and while the first transaction is pre-committing, but before the first transaction commits, a third transaction creating a commit dependency on the first transaction and reading the modified version.

20. The method of claim 19, wherein the method further includes the third transaction continuing processing, but waiting to commit until the first transaction commits.

* * * * *